Dec. 4, 1962     N. H. WENT ETAL     3,067,162
METHOD OF FORMING UNIFORM-SIZED PLASTICIZED RESIN
GRANULES AND RESULTING PRODUCT
Filed Oct. 21, 1958
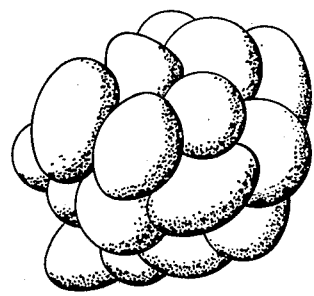
INVENTORS
Norman Henry Went
Lionel Banks
BY Johnson and Kline
ATTORNEYS United States Patent Office 3,067,162
Patented Dec. 4, 1962

3,067,162
METHOD OF FORMING UNIFORM-SIZED PLASTICIZED RESIN GRANULES AND RESULTING PRODUCT
Norman Henry Went and Lionel Banks, London, England, assignors to Staflex Company Limited, London, England, a British company
Filed Oct. 21, 1958, Ser. No. 768,805
Claims priority, application Great Britain Oct. 24, 1957
4 Claims. (Cl. 260—31.8)

The present invention relates to the production of resins in granular form.

Some types of synthetic resins are supplied by the manufacturers of the resins in powder form and for certain applications this form is not the most desirable. For some purposes it is preferable to have the resins in granular form of specified size. In addition it is also desirable in many cases, for example in the extrusion of thermoplastic resins, to have the granular resin in a form in which the required amount of plasticiser is already incorporated in the resin.

Granules already contain the plasticiser, pigments or other desired additives may be applied on to the surface of sheet materials as for example metal, cloth, plastic films or paper, in any desired pattern and the treated surfaces is then heat treated or calendered so that the resin granules become fully plasticised and made to adhere to the surface. This process can produce a pattern of coloured dots contrasting with the ground colour of the surface.

Various methods have been proposed whereby synthetic resins incorporating plasticiser can be produced in granular form.

In one such method a commercially available latex based on synthetic resins is plasticised and the plasticised material then separated from the water phase and then ground. Difficulty is experienced in grinding the bulk to produce a granule of the desired size. Moreover granules of widely varying sizes are produced together with an extensive quantity of fines. Thus if a narrow range of particle size is desired this method is exceedingly wasteful.

According to another proposed method the powdered resin and plasticiser is mixed in a heavy blade type mixer. Here again it is difficult to control the granule size and the process frequently results in a considerable portion of lumps which do not readily break up. A refinement on this method is to spray the plasticiser onto the resin during the mixing. Whilst this method considerably improves the distribution of the plasticiser throughout the resin powder there is still a tendency to produce an undesirable amount of coarse granules considerably over size particularly where it is desired to incorporate a relatively large amount of plasticiser.

The result of all these proposed methods is to produce an abundance of coarse, over size material and a considerable amount of undersized fines. The oversized material has to be ground which produces a mixture of granules which are not free-flowing and an undesirable quantity of fines.

It has now been found that to obtain granules of vinyl resin of desired uniform size it is necessary to control the conditions firstly under which the plasticiser is distributed throughout the resin and secondly is incorporated into the resin.

According to the present invention a method for the production of vinyl resin in granular form and having plasticiser incorporated therewith comprises agitating at elevated temperatures between about 40° C. and 60° C. a mixture of an aqueous dispersion of the vinyl resin in finely divided form and an aqueous dispersion of plasticiser for a period of at least two hours until granules of the desired size are formed and subsequently separating the granules from the aqueous media.

The agitation of the two dispersions firstly causes the plasticiser to be evenly distributed throughout the resin and secondly for the plasticiser to be absorbed by the resin particles which then coalesce or partially coalesce together to form granules of regular or irregular shape.

Conveniently dispersing agents may be added when forming the dispersions of the powdered resin and likewise emulsifying agents and emulsion stabilisers may be added to the plasticiser.

The invention is applicable to vinyl resins generally which are receptive of plasticisers and which can be softened at the elevated temperatures referred to above and the terms "vinyl polymer," "vinyl resin" and "resin" in the specification and claims includes vinyl polymers represented chemically by the recurring unit

—CH$_2$—CHR— where R is a halogen atom or an aryl radicle or an aliphatic acyl radicle, examples of such resins being polyvinylchloride, polystyrene, polyvinylacetate and conjoint polymers thereof.

Any suitable plasticiser may be employed and with the vinyl type of polymer conventional plasticisers, for example ester and polyester plasticisers, are suitable.

When using a copolymer, for example polyvinyl chloride/acetate, it is preferred to incorporate into the polymer approximately 30–40% by weight of polymer of a plasticiser or plasticiser mixture and conduct the agitation, which normally consists of stirring, by means of a simple propeller stirrer, between 40–60° C. The elevated temperature is employed in order to reduce the time necessary for the absorption or partial absorption of the plasticiser.

The plasticiser is prepared as an emulsion by stirring an aqueous solution of ethanolamine and adding to this while stirring at high speed a solution of oleic acid in the plasticiser, the ethanolamine oleate thus formed acting as an emulsifying agent. If desired an emulsion stabiliser such as methylcellulose may also be added.

To obtain the resin dispersion when using a fine powder of the resin, for example having a particle size substantially passing through a 100 British Standard screen mesh, the resin powder is stirred with from five to ten times its weight of water using a dispersing agent if desired. The plasticiser dispersion is then added with continuous stirring. This operation is carried out at a temperature which is below that at which any degree of plasticiser absorption by the resin occurs. The temperature is then elevated to 45–55° C. or somewhat higher if necessary to provide for the rapid absorption of the plasticiser consistent with the maintenance of a stable dispersion of the resin particles. The processing at this elevated temperature may take two hours or longer.

The stirring operation is preferably effected by means of a simple propeller type stirrer, the speed of which can be readily regulated. The time of stirring, speed of stirring, the location of the stirrer in the vessel in which the reaction takes place, and the control of the upper temperature during the mixing process are the prime factors in controlling the granule size.

The granules are then separated from the remaining water by decantation through a filter and may be further separated in a centrifugal separator. After this the residual water can be removed by treatment with warm air in any suitable form of drying apparatus. The resultant granular product is free flowing and of a substantially uniform size.

The characteristic of the granules produced in accordance with the present invention is that particles of powder forming each granule are only partially coalesced and under magnification appear as a cluster of particles partially coalesced together.

The essential characteristic shape of a granule produced in accordance with the process of the present invention is shown in the accompanying drawing showing a much magnified external view of such a granule. It will be seen that the individual particles, of which there may be few or many, are aggregated or clustered together and where they touch are partially coalesced, the general appearance being somewhat similar to a bunch of grapes. Each particle consists of a plasticised resin the plasticiser being thoroughly incorporated into the resin and when used subsequently in a manufacturing process with the application of a softening medium, such as heat, further coalescence takes place to produce complete or partial coalescence as desired.

This form of granule is quite different from the known granules of synthetic resin which have a smooth exterior with consequently a smaller surface exposed to subsequent treatment.

This form of granule has particular application where it is desired to subject the granules to further treatment to complete their coalescence.

By carrying out the method of the present invention the plasticiser is absorbed slowly owing to its dispersed form and it is therefore distributed uniformly amongst the resin particles. Furthermore the particle size of the plasticiser dispersion is equal to or smaller than that of the resin particle and as a result the plasticiser is absorbed by the resin particles and the formation of coarse aggregates is largely avoided.

The following examples of the invention are given:

Example 1

A plasticiser emulsion is first prepared as follows: 30 parts by weight of the plasticiser diethylhexyphthalate and 0.18 part of oleic acid are thoroughly mixed together and heated to 40° C. This mixture is then added with high speed continuous stirring to a mixture of 30 parts of water and 0.09 part of triethanolamine previously heated to 40° C. The resultant product is a 50/50 oil in water emulsion.

100 parts of a vinyl resin copolymer of vinyl chloride and vinyl acetate known under the trade name Vinylite VYHH is added to 540 parts of water at 40° C. in a mixing vessel using a 7" diameter propeller mixer rotating at a speed of 500 revolutions per minute. When the powdered resin has been thoroughly dispersed, the plasticiser emulsion is slowly added. The temperature of the resultant mixture is then raised to 55° C. and maintained at this temperature for two hours while stirring continuously. The mix is then cooled to 25° C. and the resin granules separated from the water by means of a centrifuge. The moist granules are dried in a current of warm air maintained at a temperature of 20–40° C.

In this way a granule is produced having the following size analysis:
90%—passing 20 and retained on 60 British Standard mesh
10%—passing 60 British Standard mesh.

Example 2

Ingredients: Parts by weight
Vinylite resin VYNS (vinyl chloride-vinyl acetate copolymer) _____ 40
Diethylhexylphthalate _____ 40
Abrac A_____ 5
Calcium carbonate_____ 5
Triethanolamine _____ 1
Oleic acid_____ 3

In the above recipe the stabiliser Abrac A, which is an epoxy glyceride, is mixed with the plasticiser diethylhexylphthalate and oleic acid in the preparation of the plasticising emulsion. The calcium carbonate is mixed with the Vinylite resin in the preparation of the powdered resin dispersion. The conditions of mixing are the same as in Example 1.

In this specification and claims the term dispersion includes not only dispersion of solids in liquids but also emulsions, i.e. when both phases are liquid.

If desired pigments and other materials may be incorporated into the granules to produce any desired effect.

What we claim is:
1. A method for the production of uniform-sized free-flowing plasticized resin granules consisting of partially coalesced particles of vinyl polymer which comprises agitating for a period of at least two hours at a temperature between 40° and 60° C. a mixture of an aqueous dispersion of the vinyl polymer in finely divided particles, said dispersion comprising 1 part by weight of vinyl polymer and from 5 to 10 parts by weight of water, with an aqueous dispersion of a plasticizer for the vinyl polymer to cause the plasticizer to be uniformly absorbed by the particles and evenly distributed therein and to cause the particles to aggregate and coalesce together in groups to form granules which are free-flowing and of a substantially uniform size, and separating said granules from said water.

2. A process for the production of resin in granular form as claimed in claim 1 wherein the weight of plasticizer to vinyl polymer does not exceed 40%.

3. A method as claimed in claim 1 wherein the resinous vinyl polymer has the repeating unit $$-CH_2-CHR-$$

where R is selected from a group consisting of a halogen atom, an aryl radical and an aliphatic acyl radical.

4. Uniform-sized free-flowing plasticized resin granules consisting of partially coalesced particles of vinyl polymer prepared according to the method of claim 1.

References Cited in the file of this patent

UNITED STATES PATENTS

| | | |
|---|---|---|
| 2,282,037 | Dahle _____ | May 5, 1942 |
| 2,373,347 | Schoenfeld _____ | Apr. 10, 1945 |
| 2,575,553 | Kolvoort _____ | Nov. 20, 1951 |
| 2,613,191 | McGaffin et al. _____ | Oct. 7, 1952 |
| 2,800,463 | Morrison _____ | July 23, 1957 |
| 2,958,669 | Hoffmann _____ | Nov. 1, 1960 |

UNITED STATES PATENT OFFICE
CERTIFICATE OF CORRECTION

Patent No. 3,067,162                December 4, 1962

Norman Henry Went et al.

It is hereby certified that error appears in the above numbered patent requiring correction and that the said Letters Patent should read as corrected below.

Column 1, line 26, for "surfaces" read -- surface --; column 4, Example 2, line 3 thereof, for "40" read -- 100 --.

Signed and sealed this 14th day of May 1963.

(SEAL)
Attest:

ERNEST W. SWIDER
Attesting Officer

DAVID L. LADD
Commissioner of Patents